United States Patent [19]

LaStrange et al.

[11] Patent Number: 5,933,142

[45] Date of Patent: Aug. 3, 1999

[54] USER-CONTROLLABLE PERSISTENT BROWSER DISPLAY PAGES

[75] Inventors: Thomas E. LaStrange, Colorado Springs; Monty L. Hammontree, Monument, both of Colo.

[73] Assignee: Sun Microsystems, Inc., Palo Alto, Calif.

[21] Appl. No.: 09/032,354

[22] Filed: Feb. 27, 1998

Related U.S. Application Data

[63] Continuation of application No. 08/654,138, May 28, 1996, Pat. No. 5,784,058.

[51] Int. Cl.$^6$ ........................................................ G06F 3/00
[52] U.S. Cl. ................................................................. 345/340
[58] Field of Search ..................................... 345/340–347, 345/356, 357

[56] References Cited

U.S. PATENT DOCUMENTS

| | | | |
|---|---|---|---|
| 5,432,903 | 7/1995 | Frid-Nielsen | 345/349 |
| 5,467,102 | 11/1995 | Kuno et al. | 345/1 |
| 5,625,781 | 4/1997 | Cline et al. | 395/335 |
| 5,784,058 | 7/1998 | LaStrange et al. | 345/340 |
| 5,796,393 | 8/1998 | McNaughton et al. | 345/329 |

OTHER PUBLICATIONS

"FrontPage makes it fit to print", InfoWorld, (Nov. 27, 1995) p. 125.
"D&H Distributing tapped to deliver WinCast nationally . . . ," Computer Reseller News, (Oct. 7, 1996) p. 160.
"New Software From Lexis–Nexis," Law Office Technology Review, (Jun. 13, 1997), vol. 6, No. 6–1.
"Overset: Interactive," Media Daily, (Dec. 4, 1996), vol. 4, No. 5.

*Primary Examiner*—A. Katbab
*Attorney, Agent, or Firm*—James A. Pinto; William J. Kubida; Holland & Hart LLP

[57] ABSTRACT

The present invention provides a user control mechanism for selectively retaining for display a document obtained from a network. The user control is located as an icon or symbol in the browser interface for ease of use. Subsequent documents which are downloaded from the network are displayed in a separate window of the display in the computing system, and these subsequent windows are also provided with the same user control mechanism. In particular, the user can selectively create a second browser display page by following a link contained in the first browser display page, without overwriting the contents of the first browser display page.

12 Claims, 7 Drawing Sheets

Fig. 6B ness of the computing system implementing
USER-CONTROLLABLE PERSISTENT BROWSER DISPLAY PAGES This is a continuation of application Ser. No. 08/654,138, filed on May 28, 1996, now U.S. Pat. No. 5,784,058, which is hereby incorporated by reference in its entirety.

BACKGROUND OF THE INVENTION

1. Field of the Invention

The present invention relates in general to the display of multiple pages of information within a computing system. More particularly, the present invention relates to controllably displaying multiple pages of information obtained over a network such as the Internet.

2. Description of Related Art

Computers or electronic devices which access information over the network, such as the Internet, generally utilize a software interface which permits the user to direct the operation of the computer in obtaining information from the network. In the case of the Internet, a network browser is conventionally utilized as an interface to display information derived from the network on the user's computer. Information is provided by various "web sites" from various locations in the network. This information can include text, graphics, sound files, video files, and other data. Users access this information by selecting links, such as HTML hyper links, which load URL (uniform resource locator) addresses into the browser and cause the browser to fetch the desired information from the network.

Conventional browser programs generally utilize a single document display method, wherein for each document loaded from the network into the browser, the previously displayed document is erased from the display and the new document is displayed therein.

Conventional browsers also do not permit the user to easily nor conveniently display simultaneously multiple documents obtained from different locations within the network. In particular, conventional browsers do not allow a user to selectively create a second browser display page by following a link contained in the first browser display page, without overwriting the contents of the first browser display page.

SUMMARY OF THE INVENTION

In accordance with the present invention, the above problems of conventional displays in a browser system, have been solved by a method for controlling the persistence of browser display pages on a computer screen display. The controlling of the persistence of a browser display page is accomplished while linking the display of the next page. A first page for display is selected as to whether or not it is to persist on the display after a second page for display is selected by the browser. If the first page is to persist, a new window is opened in the browser for the second page. The second page is linked to the new window, when the second page is selected, and the second page is displayed in the new window.

The above computer implemented steps in another implementation of the invention are provided as an article of manufacture, i.e., a computer storage medium containing a computer program of instructions for performing the above described steps.

In a machine implementation of the invention, apparatus controls the display of pages selected by a browser system in a computer where the computer has a processor, a keyboard, a computer display device and a plurality of data storage devices. The apparatus comprises a sticky page selecting module, a page opening module and a link module along with the display device. The sticky page selecting module selects whether or not a first page is to persist on a display by the computer display device after a second page for display is selected by the browser system. The page opening module, in response to the sticky page selecting module selecting the first page as a page to persist, opens a new window on the display for the second page. The link module links the second page to the new window when the second page is selected by the browser system. The display device displays the second page in the new window.

The great advantage and utility of the invention is that the user controls the persistence of a display of a document obtained over the network.

Another utility of the present invention is that the user can follow a link from a first browser page and selectively create a separate second browser page containing the data corresponding to the link, without overwriting the first browser page.

Still another utility of the present invention is that any conventional browser program can be modified to incorporate the invention disclosed herein.

The foregoing and other features, utilities and advantages of the invention will be apparent from the following more particular description of a preferred embodiment of the invention as illustrated in the accompanying drawings.

DETAILED DESCRIPTION OF PREFERRED EMBODIMENTS

The embodiments of the invention described herein are implemented as logical operations in a computing system. The logical operations of the present invention are implemented (1) as a sequence of computer implemented steps running on the computing system and (2) as interconnected machine modules within the computing system. The implementation is a matter of choice dependent on the performance requirements of the computing system implementing the invention. Accordingly, the logical operations making up the embodiments of the invention described herein are referred to variously as operations, steps, or modules.

The operating environment in which the present invention is used encompasses general distributed computing systems wherein general purpose computers, work stations, or personal computers are connected via communication links of various types. In a client server arrangement, programs and data, many in the form of objects, are made available by various members of the system.

In accordance with the invention, users at remote terminals in a network communicate through the network to a server or a web site and are able to download data from the server or web site to the user's client work station. As this embodiment of the invention is described herein, a web browser program on a client station for browsing a network, such as the Internet, will be referred to as the browser, while the server work station with which the browser station is communicating during a download will be referred to as the server.

Figure 1:
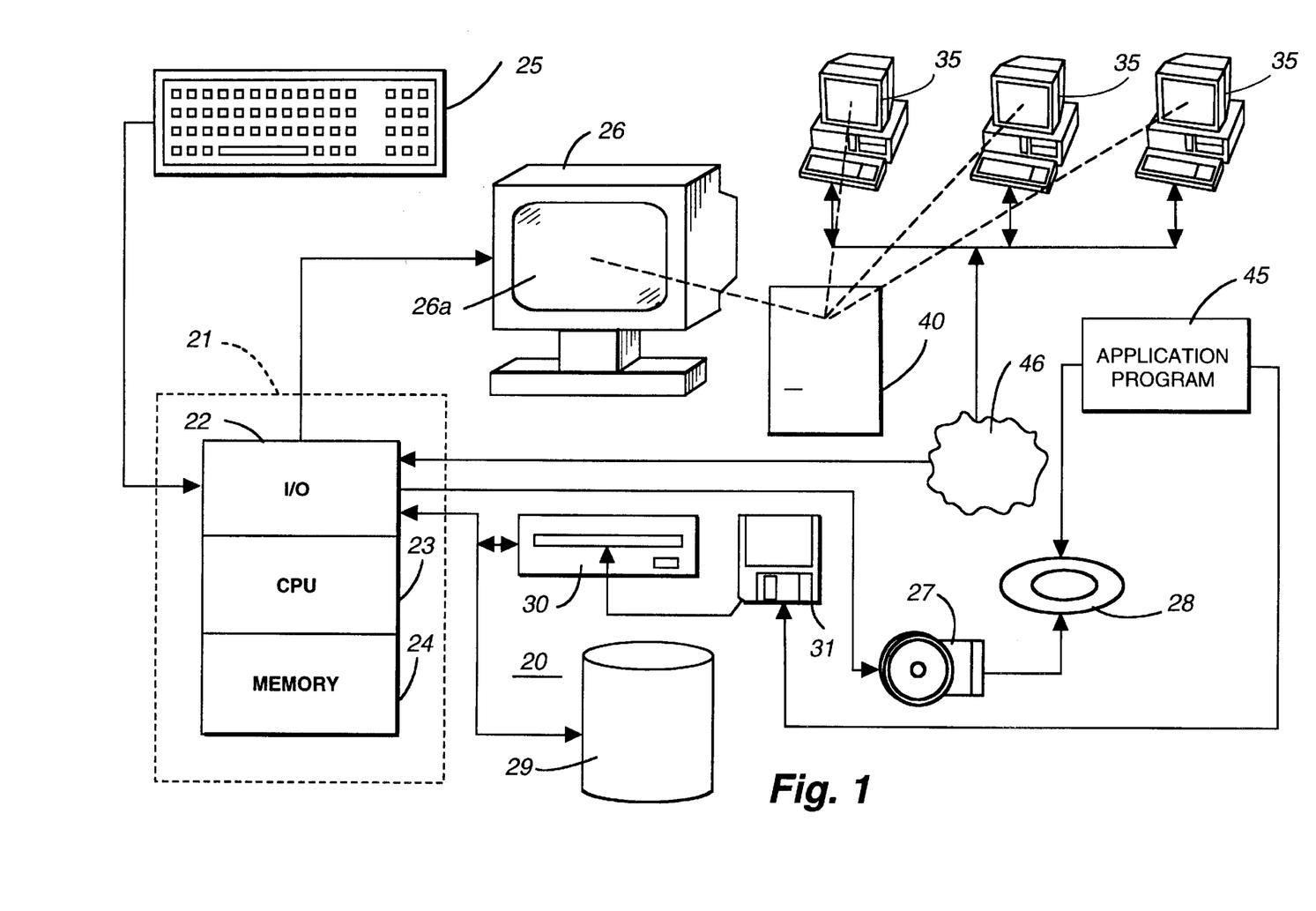
FIG. 1 illustrates a computing system in a communications network, such as the Internet, to perform the logical operations of the invention.

Referring to FIG. 1, data processing system 20, acting as a server through an application program 45, places a plurality of web pages 40 for access over network 46 by remote client stations 35. These web pages are originated by the application program 45 running on the client, or could be static web pages residing on the client. Web pages 40 can contain data including text, graphics, audio files, video files, and other forms of data. Included in web pages 40 are links which have textual labels and URL destination addresses associated therewith.

In FIG. 1, processor 21 includes an input/output section 22, a central processing unit 23, and a memory section 24. The input/output section 22 is connected to a keyboard 25 a display or monitor 26, and a disk storage unit 29 as well as an optical disk drive unit 27 for reading a CD Rom 28 and a floppy disk drive unit 30 for reading a diskette 31. Application program 45 may be loaded into the computing system 20 from either the CD Rom 28 or diskette 31. The input/output unit 22 includes a communications adapter (not shown) communicating on the network 46 to the remote client stations 35 containing the browser. Clients 35 also have displays 26 having display screens 26A.

Examples of computing systems that may be used as either a server 20 or a client 35 include the SPARC systems offered by Sun Microsystems, Inc., personal computers offered by IBM Corp., and by other manufacturers of IBM compatible personal computers and systems running the UNIX, OS/2, AIX, DOS, etc. operating systems or the Solaris™ operating system.

Figure 2:
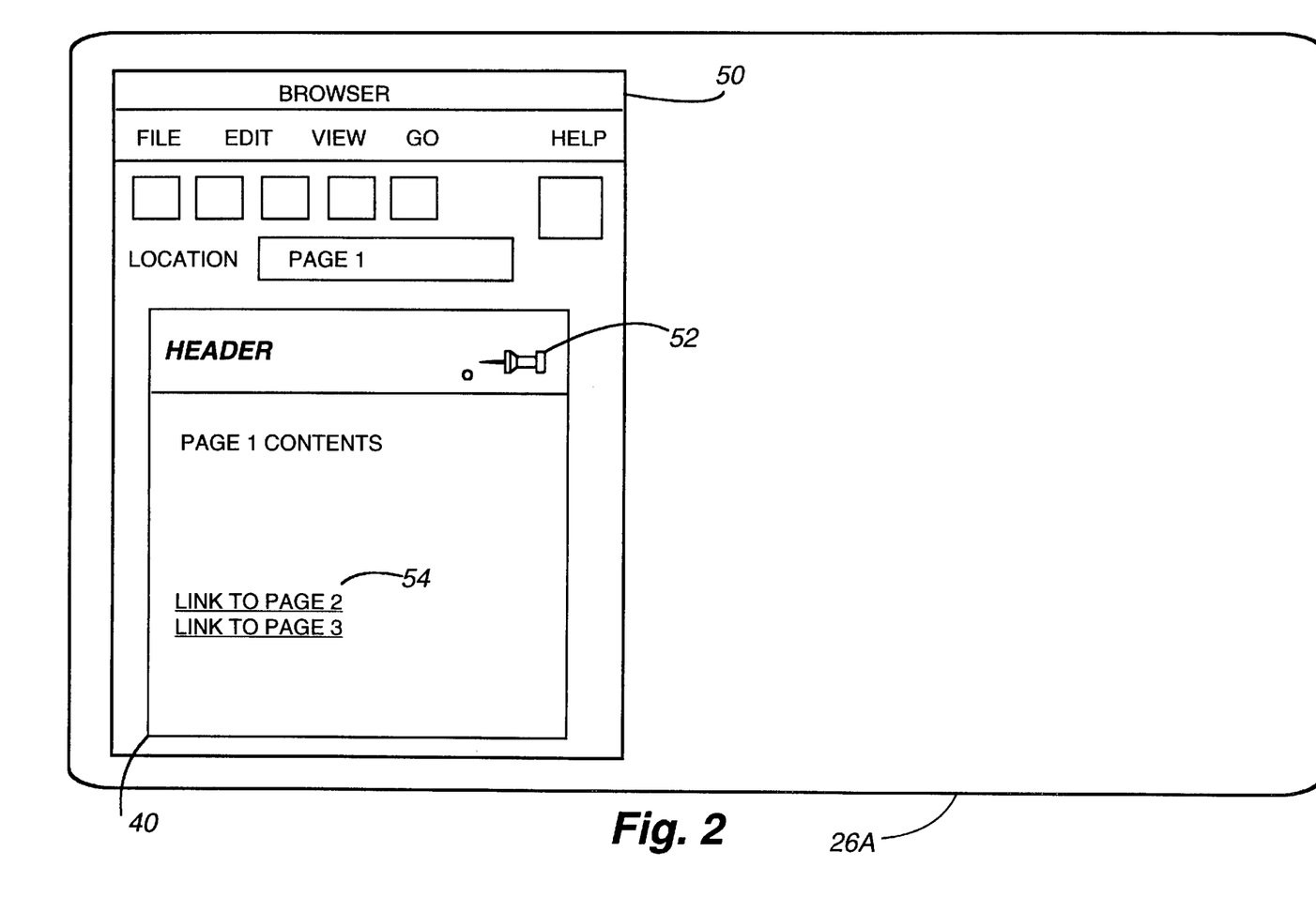
FIG. 2 is an example of a display according to the preferred embodiment of the invention containing the data contents of a first page, along with a user-controllable push pin symbol referred to herein as the sticky page control.

Referring to FIG. 2, display screen 26A is shown having a browser 50 displaying web page 40 therein. In accordance with the preferred embodiment of the present invention, a sticky page push pin symbol 52 is displayed within the browser 50 as a user controllable switch. The symbol 52 is placed in browser 50 so that the user can easily access the symbol without having to access any menus or sub-menus.

Figure 4:
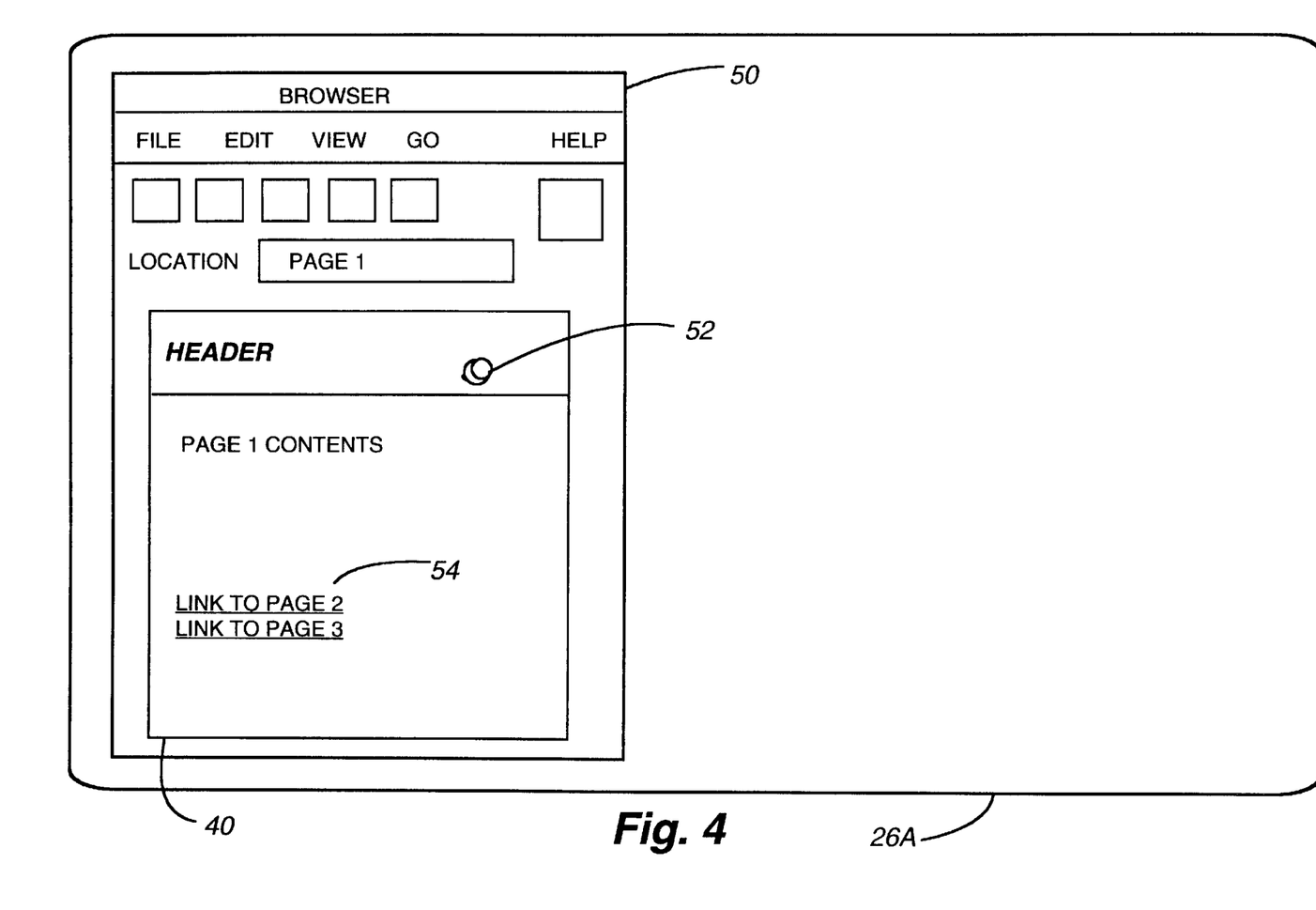
FIG. 4 is an example display containing a first page of data contents, wherein the sticky page control of the present invention is enabled.

Symbol or switch 52 has two states. The first state represents an unapplied push pin indicating that the sticky page feature of the present invention is presently disabled. The second state of symbol 52 is shown in FIG. 4, and represents a push pin having been inserted into the browser, indicating that the sticky page feature of the present invention has been enabled.

As will be described in greater detail below, when the sticky page feature of the present invention is enabled, the current display page of browser 50 is maintained despite the creation of a subsequent display page derived from a hyper link followed from the current display page. If the sticky page feature of the present invention is disabled, then the present page of information displayed will be overwritten by any subsequent pages displayed in the browser. Because the sticky page feature is user controllable through the switch 52 represented by the push pin, the user determines which pages within the browser should be persistently maintained on the computer display 26A.

As shown in FIG. 2, web page 40 can contain hyper links 54 which provide the user with a means to load another web page 40 into browser 50. Hyper links 54 are associated with URL (uniform resource locator) addresses pointing to unique locations of information in the computing network.

Figure 3:
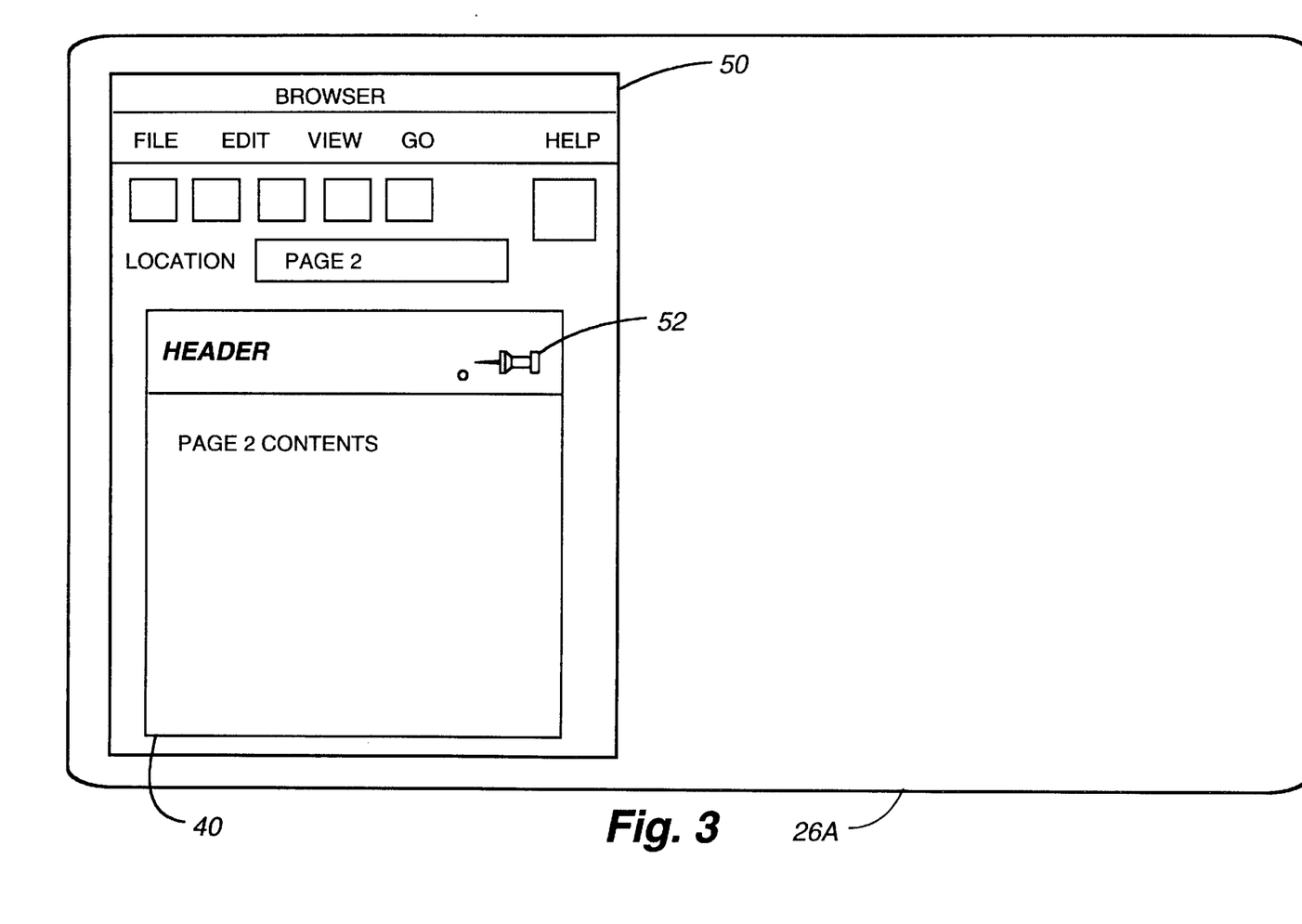
FIG. 3 is an example display containing a second page of data contents.

FIGS. 2–3 are illustrative of the operations of the preferred embodiment of the present invention when the sticky page feature is disabled. As described above, FIG. 2 illustrates a first web page 40 having a hyper link 54 to load a second web page into browser 50. As indicated in FIG. 2, push pin symbol 52 is not enabled, indicating that the user has not closed the switch associated with symbol 52.

Assuming the user selects the hyper link 54 "LINK TO PAGE 2" to load PAGE 2 into browser 50, FIG. 3 shows that the contents of web PAGE 2 will overwrite the previous display containing the first web page. Web PAGE 1 was overwritten by web PAGE 2 because the user had not enabled the sticky page feature through symbol or switch 52.

Figure 5:
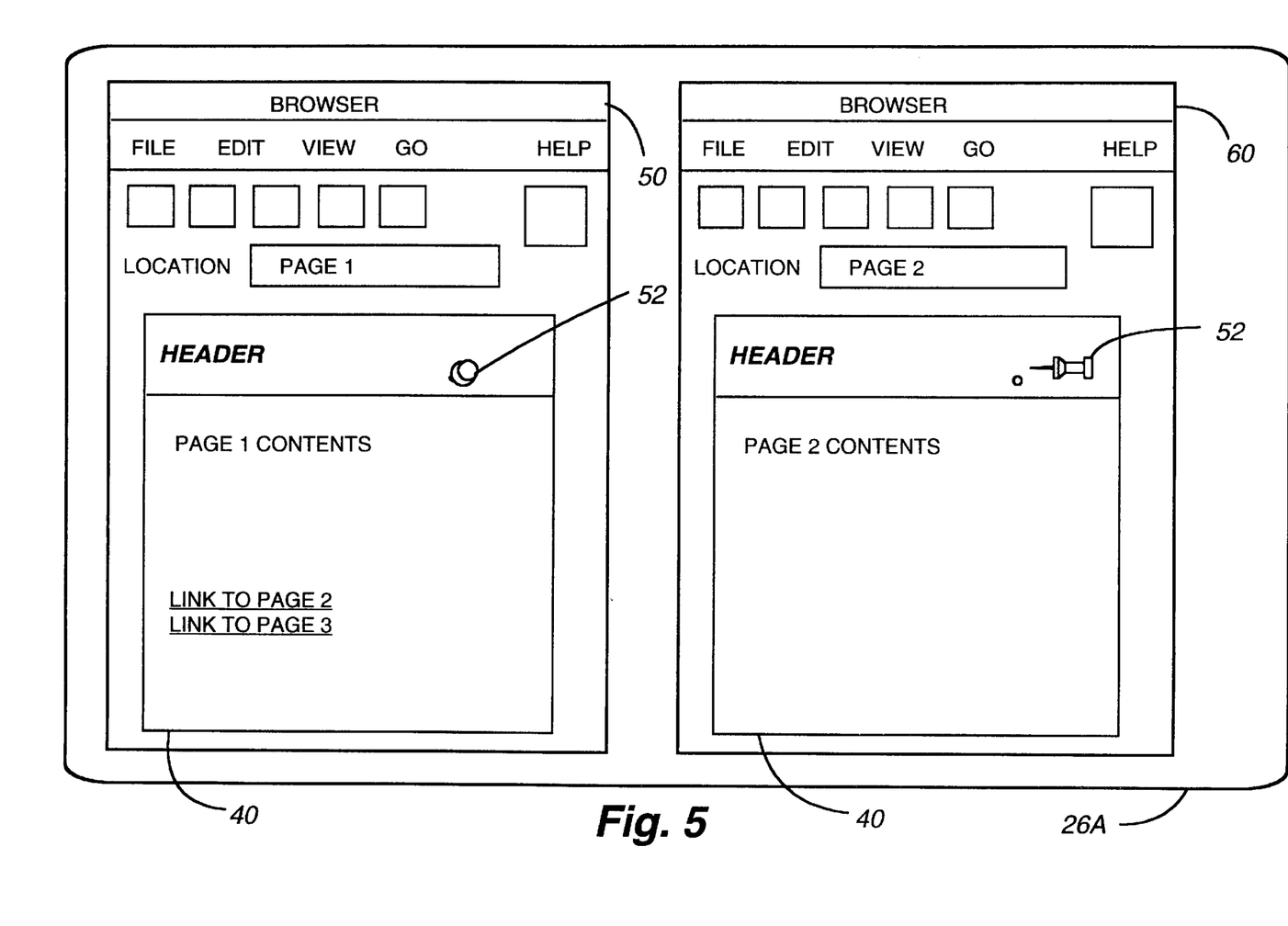
FIG. 5 is an example display illustrating the operation of the present invention, wherein a first page is persistently displayed while a second page is simultaneously displayed adjacent to the first page, the second page created by following a link contained on the first page.

FIGS. 4–5 illustrate the operation of the sticky page feature when the switch represented by push pin 52 is depressed. As shown in FIG. 4, the user has depressed push pin symbol 52 into the display of the first web page 40. According to the present invention, web PAGE 1 will therefore be persistently maintained in the display 26A.

If the user activates hyper link 54 "LINK TO PAGE 2" contained within the first web page, a second browser window 60 will be created to display the contents of the second web page, as shown in FIG. 5. The initial web PAGE 1, having push pin symbol 52 depressed thereon, is not overwritten by the display of the second web page 60. In this manner, the user has selectively retained the display of the first web page while simultaneously viewing the contents of the second web page.

While FIGS. 2–5 illustrate a browser of approximately half the size of the display screen 26A, it will be understood by those of ordinary skill in the art that the relative sizes of the browser windows could be controlled either programmatically or by the user. Furthermore, while FIG. 5 illustrates the first and second browser windows being substantially adjacent to one another, it will also be understand to one of ordinary skill in the art that these pages could be overlapped or reduced in size either programmatically or at the user's control. The particular implementation of the window sizing and positioning is a matter of choice.

Figure 6A:
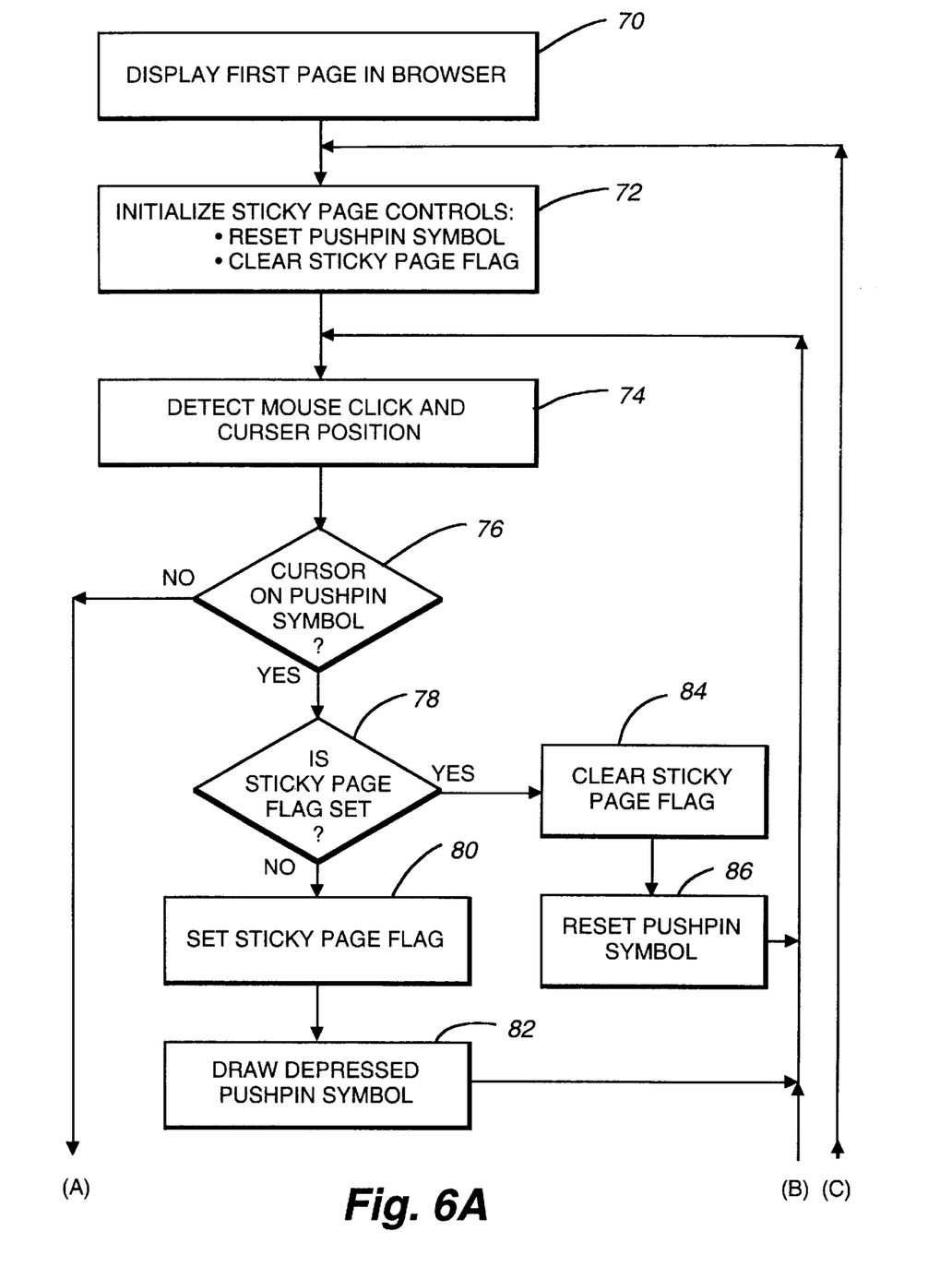
FIGS. 6A through 6B illustrate the logical operations to implement the preferred embodiment of the present invention.
Figure 6B:
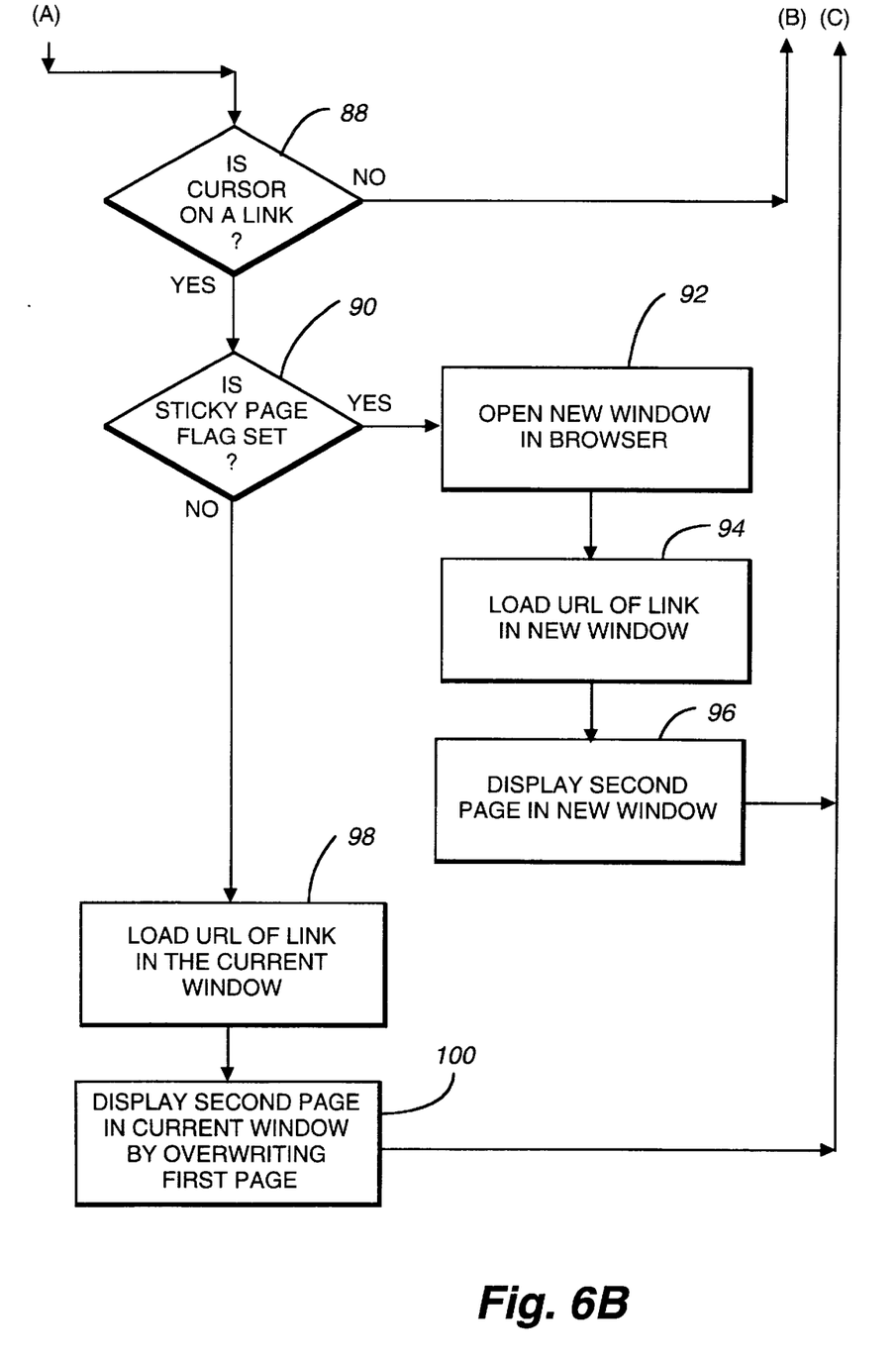

FIGS. 6A–6B illustrate the logical operations of the preferred embodiment of the present invention. Reference will be made with respect to the operations and the corresponding actions illustrated in FIGS. 2–5.

Operation 70 of FIG. 6A displays a first web page in a browser, as depicted in FIG. 2. Operation 72 then initializes the sticky page controls by resetting the push pin symbol and clearing a sticky page flag. The push pin symbol is reset by drawing a side view of the push pin symbol, as shown in FIG. 2. The sticky page flag is used to programmatically determine if the sticky page feature has been enabled or disabled by the user.

Assuming that the user has provided some input to the computing system through an input device, such as a keyboard mouse, operation 74 detects the user input (i.e., a change in the cursor position or a mouse button depression or release).

Operation 76 determines if the cursor, under the user's control, has been placed over the push pin symbol. If so, decision operation 78 determines if the sticky page flag is presently set. If the sticky page flag has not been set, then the user input indicates that the user desires to enable the sticky page feature. Therefore, operation 80 sets the sticky page flag and operation 82 graphically depicts the push pin symbol as depressed (as shown in FIG. 4).

If operation 78 determines that the sticky page flag has already been set, then the user input indicates that the user is disabling the sticky page feature. Therefore, operation 84 clears the sticky page flag and operation 86 graphically resets the push pin symbol as illustrated in FIG. 2. Both operations 82 and 86 return control to operation 74 to detect and subsequently process any further user input.

If operation 76 determines that the cursor was not placed on the push pin symbol, then operation 88 (FIG. 6B) determines if the user selected a hyper link for leading a new web page into the browser. If operation 88 determines that the cursor was not placed on a hyper link, then control is returned to operation 74 to detect and subsequently process any additional user input. Otherwise, the user has selected a hyper link for loading a new web page into the browser.

Operation 90 determines if the sticky page flag is presently set. If the sticky page flag is set, then the sticky page feature has been enabled by the user, and operation 92 opens a new window in the browser for display of the new web page. Operation 94 loads the corresponding URL of the hyper link in the new window, while operation 96 displays the new web page in the new window. Because a new window was created, the first page of the browser displayed at operation 70 (FIG. 6A) is maintained within the computer display. Therefore, both the first page and the second page are now displayed to the user. Operation 96 returns control to operation 72 (FIG. 6A) so that the new browser window presently displayed with the second web page can also utilize the sticky page feature of the present invention.

In this manner, the operations of FIG. 6A–6B could be repeated as many times as the user requires. Therefore, while FIGS. 2–5 illustrate two windows simultaneously displayed, it will be understood that the present invention would permit a user to simultaneously display any number of windows without overriding the content of the windows having a depressed push pin symbol therein.

If operation 90 determines that the sticky page flag has not been set, then operation 98 loads the URL associated with the hyper link into the current window. Operation 100 then displays the second web page in the current window by overriding the display of the first web page, as illustrated in FIGS. 2–3. Operation 100 then returns control to operation 72 for initialization of the sticky page feature of the present invention.

While the invention has been particularly shown and described with reference to a preferred embodiment thereof, it will be understood by those skilled in the art that various other changes in the form and details may be made therein without departing from the spirit and scope of the invention.

What is claimed is:

1. A method for controlling the persistence of browser display pages on a computer screen display, said method comprising the computer implemented steps of:

displaying a first page of information in a first browser window on the display, said first page of information containing one or more links to other pages of information;

determining whether or not the first page is to persist on the display in the first browser window;

providing for the selecting a link contained in said first page of information to retrieve a second page of information;

if the first page of information is to persist on the display in the first browser window, opening a second browser window on the display for displaying the second page of information;

providing for the retrieval of said second page of information located at an address specified by said link; and     displaying the second page of information in the second browser window.

2. Apparatus for controlling the display of pages selected by a browser system in a computer, the computer having a processor, a keyboard, a computer display device and a plurality of data storage devices, said apparatus comprising:

sticky page selecting module for selecting whether or not a first page is to persist on a display by the computer display device after a second page for display is selected by the browser system, said sticky page module providing a user selectable symbol within said display permitting a user to select if said first page should be retained within said first browser window;

a page opening module, responsive to said sticky page selecting module selecting the first page as a page to persist, for opening a new window on the display for the second page;

a link module linking the second page to the new window when the second page is selected by the browser system; and     said display device displaying the second page in the new window.

3. A method for displaying two or more pages of information within a display of a computer, the method comprising the steps of:

displaying a first page of information within a first browser window, said first page of information containing a link to a second page of information;

determining if said first page should be retained within said first browser window;

obtaining the second page of information over a network, said second page of information located at an address specified by said link; and     if said determining step determined that said first page should be retained within said first browser window, opening a second browser window for displaying said second page in said second browser window.

4. The method of claim 3, wherein said step of opening a second browser window positions a portion of said second browser window overlapping said first browser window.

5. The method of claim 3, wherein said step of opening a second browser window positions said second browser window so that substantially all of said first browser window and said substantially all of said second browser window can be viewed simultaneously.

6. The method of claim 3, further comprising:

providing a user control for re-positioning said second browser window.

7. The method of claim 3, further comprising:

providing a user control for re-sizing said second browser window.

8. The method of claim 3, wherein said first and second browser windows are different sizes.

9. A method for displaying two or more pages of information on a display of a computer, the method comprising the steps of:

displaying a first page within a first window, said first page containing a link to a second page of information;

determining if said first page should be retained within said first window;

obtaining the second page of information, said second page of information located at an address specified by said link; and if said determining step determined that said first page should be retained within said first window, opening a second window for displaying said second page in said second window.

10. The method of claim 9, wherein said step of opening a second window positions a portion of said second window overlapping said first window.

11. The method of claim 9, wherein said step of opening a second window positions said second window so that substantially all of said first window and said substantially all of said second window can be viewed simultaneously.

12. A computer program product comprising:

a computer useable medium having computer readable code embodied therein for displaying two or more pages of information on a display of a computer, comprising:

computer readable program code devices configured to cause a computer to effect displaying a first page within a first window, said first page containing a link to a second page of information;

computer readable program code devices configured to cause a computer to effect determining if said first page should be retained within said first window;

computer readable program code devices configured to cause a computer to effect obtaining the second page of information, said second page of information located at an address specified by said link; and computer readable program code devices configured to cause a computer to effect opening a second window for displaying said second page in said second window if said determining step determined that said first page should be retained within said first window.

* * * * *